May 20, 1930.                W. H. GRIMDITCH                1,759,745
CURRENT RECTIFYING SYSTEM
Filed Oct. 22, 1925
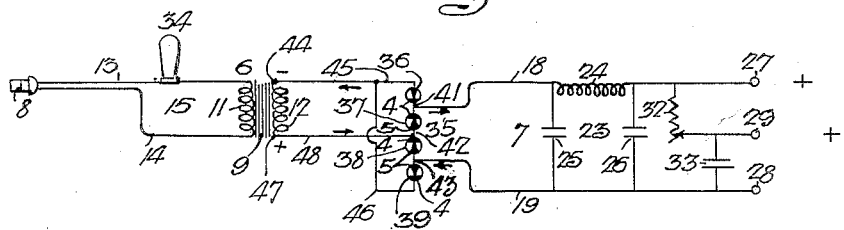
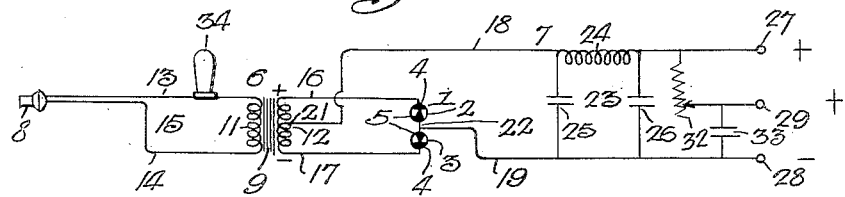
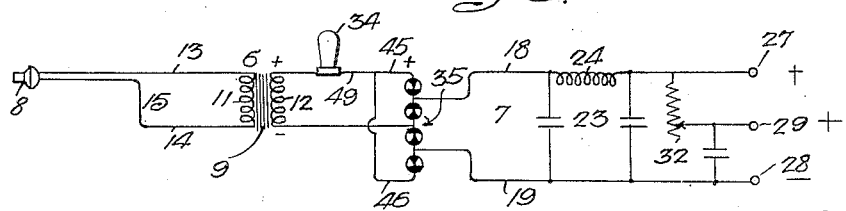
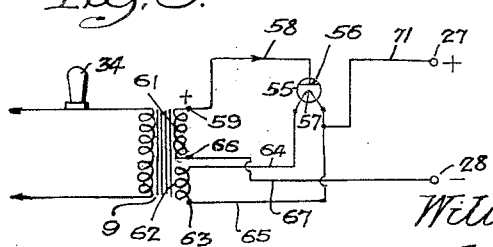
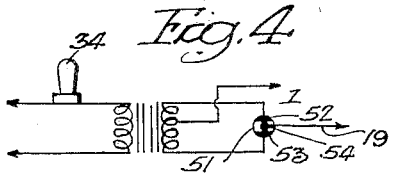
Inventor—
William H. Grimditch.
by his Attorneys—
Howson & Howson Patented May 20, 1930

1,759,745

UNITED STATES PATENT OFFICE

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

CURRENT-RECTIFYING SYSTEM

Application filed October 22, 1925. Serial No. 64,184.

My invention relates to electrical systems, and it has particular relation to systems for rectifying alternating currents.

One object of my invention is to provide a current-rectifying system which shall be particularly advantageous with electrolytic, dry contact or other film type rectifying units.

A more specific object of my invention is to provide protective means for use with rectifying units, whereby the currents may be limited to safe values at all times, independent of the operation, inoperation or break down of the rectifier or other units in the circuit.

Another object of my invention is to provide protective means that shall prevent excessive overloading of the rectifying units in starting up and under abnormal conditions, so as to increase the useful life of said units, but which shall not seriously affect the electrical characteristics of the system under normal conditions.

A further object of my invention is to provide simple and effective voltage-regulating means for a rectifying system, said means also serving as a protective device.

A still further object of my invention is to provide means that shall permit an initial surge of current through the rectifier to facilitate the formation of a film and then decrease the current flow while the normal working film continues to form.

Other objects and applications of my invention, as well as details of construction and operation, whereby my invention may be practised, will be apparent more fully hereinafter, when taken in connection with the accompanying drawing, wherein:—

Fig. 1 is a diagrammatic view of circuits and apparatus embodying one form of my invention; and Figs. 2 to 5, inclusive, are similar views of alternative embodiments of my invention.

Referring to Fig. 1, a rectifier 1 comprises a pair of rectifying units or cells 2 and 3, which may be of any well-known type, such, for example, as electrolytic cells employing aluminum, tantalum or other film-forming metal as the rectifying electrode or dry contact units described in the patent to Pawlowski, No. 830,924, filed November 14, 1904, issued September 11, 1906. Each cell comprises the customary cathode 4 and anode 5. The rectifier 1 may be provided with an input circuit 6 and an output circuit 7, the former being connected by a plug 8 to an alternating-current supply circuit (not shown).

The input circuit 6 may include a transformer 9 comprising primary and secondary windings 11 and 12, respectively. This transformer may have a single winding only, if desired, as in auto transformers. The terminals of the primary winding 11 are connected by conductors 13 and 14 to the plug 8 and constitute a primary circuit 15. The terminals of the secondary winding 12 are connected by conductors 16 and 17 to the cathodes 4 of the cells 2 and 3, respectively. The output circuit 7 comprises conductors 18 and 19, the former conductor extending from an intermediate point 21 on the secondary winding 12. The latter conductor 19 extends from a conductor 22 which serves to connect the anodes 5 of the cells 2 and 3.

The pulsations in the rectified currents traversing the output conductors 18 and 19 may be smoothed out by means of filter apparatus 23 comprising an inductive reactor 24, which is serially included in the conductor 18, and capacitive reactors 25 and 26, which are connected in shunt relation to the output circuit 7 on opposite sides of the inductive reactor 24. The conductors 18 and 19 of the output circuit 7 may respectively terminate at binding-posts or terminals 27 and 28, which represents respectively the positive and negative B-terminal connections of a vacuum-tube system (not shown).

Since the detector tube of such a system may require a lower voltage than the amplifier tubes thereof, a third terminal 29 is provided, which is connected to the conductor 18 through a fixed or adjustable resistor 32 and to the conductor 19 through a capacitive reactor 33.

When the plug 8 is electrically connected to an alternating-current supply circuit (not shown), alternating currents traverse the primary circuit 15, and, as a result, alternating potentials are established in the secondary winding 12 of the transformer 9.

Assuming at any particular instant that the polarities of the terminals of the transformer secondary winding 12 are as indicated in Fig. 1, currents are established which flow from the center tap 21 of the transformer winding 12 through the conductor 18, the filtering apparatus 23, the vacuum-tube circuits (not shown), which are connected to the binding-posts 27, 28 and 29, the conductors 19 and 22, the cell 3, and the return conductor 17 to the transformer winding 12.

On the other hand, when the above-mentioned polarity changes, the currents traverse a circuit which extends from the center tap 21 of the transformer secondary winding 12 through the same course as before up to the pair of rectifier cells 2 and 3, the circuit being now completed through the cell 2 and the conductor 16. Thus both half waves of the alternating current cycle are rectified, and the filtering apparatus 23 functions in the usual manner to smooth out the ripples in the rectified unidirectional currents.

The pair of rectifying units 2 and 3, connected as they are in opposition to each other, prevent the flow of any but very small currents from conductor 16 to conductor 17 or vice versa directly through said pair of units, but should either of the units 2 or 3 of the rectifier temporarily fail to function or break down in operation, the secondary winding 12 of the transformer 9 would be short-circuited or overloaded, thereby tending to cause damaging currents to traverse the primary and secondary circuits as well as the rectifying units. The same might hold true in case of a break-down or short-circuiting of one of the condensers 25, 26 or a short-circuiting at the output terminals 27, 28, or within the radio receiving set connected thereto. The result of such heavy currents may be the burning out of the transformer 9 or injury to the rectifying units or other parts. Rectifiers of the film type often require several seconds or even minutes before they function normally when starting up after a period of idleness and at such times act to a greater or less extent as a short-circuit load especially when connected for full-wave rectification as shown in the drawings.

As a result of experiment, I have found means whereby the above-mentioned undesirable results may be avoided so that a rectifying system may be safely operated at all times and under all working conditions, without injury to the rectifying or other units from overloading. This desired result is accomplished by the use of a protective device 34 which may be connected in either the primary or secondary circuits, but preferably the former as shown in Figs. 1 and 2, all as will appear more fully hereinafter. The device 34 comprises a resistance element having a positive resistance-temperature coefficient, the resistance value of the same being relatively low at normal operating currents as compared with the impedance of the transformer winding with which the device 34 is serially connected. The resistance of the device 34 preferably increases rapidly as its temperature is increased by the passage of abnormal currents, as when a film-type rectifier fails to rectify before its films have formed or when it has broken down. The device 34 has been shown as a lamp of the type employing a metallic filament, since this form of resistance device has proven very satisfactory and convenient in practice.

The device 34 also permits an instantaneous surge of current, when the plug 8 is connected to an alternating current supply circuit (not shown), to form quickly a foundation or base film upon certain of the elements of the rectifying cells. Such surge of current, however, causes the temperature and resistance of the filament of device 34 to increase to a relatively high value and with such increase in resistance, the currents are decreased to a safe value. When the rectifying films are fully formed and the secondary load correspondingly decreased, the resistance of the lamp drops to a value less than the transformer impedance.

A further advantage of the protective device 34, as connected in Figs. 1 and 2, is that it permits voltage regulation, inasmuch as the voltage applied to the primary winding 11 and that induced in the secondary winding 12 of the transformer 9 will vary depending upon the resistance or wattage of the lamp 34 that is used, so that by changing to a lamp of greater or less wattage, the working voltage in the output circuit 7 is made higher or lower. Moreover, should the plug 8 be inserted by mistake in a direct-current circuit, or in an alternating current circuit of a lower frequency than that for which the device is designed, the transformer 9 is automatically protected by the device 34, since the resistance thereof increases with the heating caused by the increased flow of current sufficiently to prevent dangerous overloading.

The system disclosed in Fig. 2 is different from that of Fig. 1 chiefly in the provision of a rectifier 35 which employs four rectifying units or cells, namely, 36, 37, 38 and 39, rather than two cells as in rectifier 1. The cathodes 4 of the cells 36 and 37 are connected by a conductor 41. The anode 5 and the cathode 4 of the cells 37 and 38 are connected by a conductor 42, and the anodes 5 of the cells 38 and 39 are connected by a conductor 43. One terminal 44 of the transformer secondary winding 12 is respectively connected by conductors 45 and 46 to the anode 5 of the cell 36 and the cathode 4 of the cell 39. The other terminal 47 of the secondary winding is connected by a conductor 48 to the conductor 42 extending between the cells 37 and 38.

Assuming at any instant that the terminal connection 47 of the secondary winding 12 be positive, then currents traverse a circuit in the direction indicated by the arrows, that is, from the secondary winding 12 through the terminal connection 47, the conductor 48, the cell 37, the conductor 18, the filter apparatus 23, the vacuum-tube circuits (not shown) operably associated with the binding-posts 27, 28 and 29, the return conductor 19, the cell 39, and the conductors 46 and 45 to the terminal 44 of the secondary winding 12.

When the polarity of the alternating current reverses, currents flow through a circuit which extends from the terminal connection 44 of the secondary winding 12 through the conductor 45, the cell 36, the conductor 18, the filtering apparatus 23, the vacuum-tube circuits (not shown) associated with the binding-posts 27, 28 and 29, the return conductor 19, the cell 38 and the conductor 48 to the terminal 47 of the transformer secondary winding 12. The further operation of the system, including the protective device 34, is the same as that discussed in connection with Fig. 1, and it will be seen that in both cases both half waves of the alternating current cycle are rectified and utilized.

A further alternative embodiment of my invention is shown in Fig. 3, which differentiates from that shown in Fig. 2 in the insertion of the protective device 34 in series with the transformer secondary winding 12 at a point, as in the conductor 49, such that the total current delivered by the transformer to the rectifier cells passes through said device 34. When the plug 8 is connected to the alternating-current circuit, currents traverse the rectifier 35 as in Fig. 2, and the protective device 34 functions the same. In this case, however, the device 34 will not protect the transformer 9 when the plug 8 is connected to a direct-current supply.

A still further embodiment of my invention is illustrated in Fig. 4 which is distinguishable over the rectifying system of Fig. 1 in the fact that cells 2 and 3 are replaced by a single three electrode cell 51 comprising a pair of cathodes 52 and 53 and a single anode 54. Aside from the fact that the conductor 19 of the output circuit 7 is directly connected to the single anode 54, the connections of this system, as well as the operation thereof, is the same as described for Fig. 1.

A still further alternative embodiment of my invention is shown in Fig. 5, which may be distinguished from Fig. 1 in the fact that the film-type cells 2 and 3 are replaced by a space-current rectifier 55 comprising an anode 56 and a filament type cathode 57, connected for half-wave rectification instead of full-wave rectification which is used in the previous figures. The anode 56 is connected by a conductor 58 to a terminal connection 59 of one section 61 of a transformer secondary winding, a second section 62 thereof being connected by conductors 64 and 65 to the cathode 57, whereby the same may be energized. A second terminal 66 of the transformer winding 61 is connected by a conductor 67 to the negative output terminal 28. The positive output terminal 27 is connected by a conductor 71 to the conductor 65 leading to the cathode 57.

Assuming the polarity of the transformer winding 61 to be positive at the terminal 59, as indicated on the drawing, currents are established in a circuit which extends from the transformer winding 61 through the conductor 58, the space-current device 55, the conductor 71, the load circuit (not shown), which is connected to the terminals 27 and 28, and the conductor 67 to the transformer winding 61. When the polarity of the transformer winding 61 reverses, the space-current device 55 interrupts the passage of currents in the circuit above mentioned. As a result, pulsating uni-directional currents traverse the rectifying circuit. If desired, the pulsations may be smoothed out by the filtering apparatus 23 shown in connection with Figs. 1 to 3, inclusive. As in the other cases, a protective resistor 34 is serially connected in the transformer circuit to protect the transformer 9 and the rectifier 55. In this case the metallic filament resistor 34 is needed more particularly to prevent shortening the life of the rectifier tube 55 or possible irreparable injury to it by connecting a load of too low impedance to the output terminals 27 and 28.

While I have shown several forms of embodiment of my invention, for the purpose of describing the same and illustrating its principles of construction and operation, it is apparent that various changes and modifications may be made therein without departing from the spirit of my invention and I desire, therefore, that only such limitations shall be imposed thereon as are indicated in the appended claims or as are demanded by the prior art.

I claim:

1. An electrical system comprising a transformer having primary and secondary windings, a film-type rectifying device associated with said secondary winding, and a resistor having a positive temperature coefficient associated with one of said windings, said resistor having a resistance substantially less than the impedance of the transformer winding with which it is associated under normal operating conditions and greater than the impedance of said transformer winding under overload conditions.

2. A rectifying system comprising a transformer having primary and secondary windings, a film-type rectifying device associated with said secondary winding, protective means having a positive resistance temperature coefficient associated with one of said windings, the impedance of said means being less than the transformer winding with which it is associated under normal operating conditions but greater when said rectifier is passing unrectified currents, and means for smoothing the rectified currents.

3. A film-type rectifying system comprising a transformer having primary and secondary circuits, a film-type rectifier in said secondary circuit, and a metallic-filament lamp operatively associated with one of said circuits, said lamp permitting an initial surge of current through said rectifier to facilitate the formation of a film and subsequently decreasing the current while the normal working film continues to form.

4. A rectifying system comprising a film-type rectifier, primary and secondary windings of a transformer, primary and secondary circuits operatively associated with said windings, and a metallic-filament lamp positioned in at least one of said circuits, the resistance of said lamp being substantially less than the impedance of the transformer winding with which it is associated under normal operating conditions but greater than the impedance of said transformer winding when the rectifier is passing unrectified current.

5. A current-rectifying system comprising a transformer having primary and secondary circuits, a metallic-filament lamp operatively associated with one of said circuits, a film-type, full-wave rectifier connected in said secondary circuit, and filtering means electrically connected to said rectifier means, said lamp being designed to limit the currents traversing the rectifier under predetermined conditions to harmless values.

6. An electrical system comprising a transformer, a film-type rectifier having a time lag and a protective resistor, the major controlling impedance of the system residing in the transformer under normal operating conditions but in the resistor when supernormal currents tend to flow during said time lag.

7. A rectifying system comprising a film-type rectifier, and means permitting an initial surge of current through said rectifier to facilitate the formation of a film and then decreasing the current flow while the normal working film continues to form.

8. In a rectifying system, the combination with a film-type rectifier and a supply circuit therefor, means for increasing the resistance of said circuit while the rectifying film is forming and then decreasing the resistance of said circuit.

9. A set of at least two film-type rectifiers connected for full-wave rectification, a supply circuit therefor, and means for increasing the resistance of said circuit while the rectifying film is forming and then decreasing the resistance of said circuit.

WILLIAM H. GRIMDITCH.